(12) United States Patent
Prenn et al.

(10) Patent No.: US 8,738,830 B2
(45) Date of Patent: May 27, 2014

(54) HARDWARE INTERRUPT PROCESSING CIRCUIT

(75) Inventors: Mary T. Prenn, Star, ID (US); Bradley R. Larson, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 329 days.

(21) Appl. No.: 13/040,082

(22) Filed: Mar. 3, 2011

(65) Prior Publication Data

US 2012/0226845 A1    Sep. 6, 2012

(51) Int. Cl.
*G06F 13/24* (2006.01)

(52) U.S. Cl.
USPC .......................... 710/260; 710/263

(58) Field of Classification Search
USPC .......... 710/240–241, 244, 260, 262–265, 316
See application file for complete search history.

(56) References Cited

U.S. PATENT DOCUMENTS

| | | | | |
|---|---|---|---|---|
| 4,027,290 A * | 5/1977 | Subrizi et al. | ................... | 710/48 |
| 4,679,169 A | 7/1987 | de la Salle et al. | | |
| 5,070,447 A | 12/1991 | Koyama | | |
| 5,410,708 A | 4/1995 | Miyamori | | |
| 5,551,044 A * | 8/1996 | Shah et al. | ................... | 713/323 |
| 5,564,117 A | 10/1996 | Lentz et al. | | |
| 5,634,135 A | 5/1997 | Hollander | | |
| 5,721,921 A | 2/1998 | Kessler et al. | | |
| 5,812,858 A | 9/1998 | Nookala et al. | | |
| 5,901,321 A * | 5/1999 | Kim et al. | ................... | 710/264 |
| 6,081,867 A | 6/2000 | Cox | | |
| 6,256,659 B1 | 7/2001 | McLain et al. | | |
| 6,449,675 B1 * | 9/2002 | Moyer et al. | ................... | 710/269 |
| 6,539,448 B1 * | 3/2003 | Deng | ................... | 710/260 |
| 6,845,419 B1 * | 1/2005 | Moyer | ................... | 710/264 |
| 7,206,924 B2 | 4/2007 | Boles et al. | | |
| 7,991,909 B1 | 8/2011 | Schumacher et al. | | |
| 8,271,980 B2 | 9/2012 | Jackson | | |
| 2004/0153650 A1 | 8/2004 | Hillmer | | |
| 2005/0193157 A1 * | 9/2005 | Kwon et al. | ................... | 710/260 |
| 2007/0124363 A1 | 5/2007 | Lurie et al. | | |
| 2007/0300223 A1 | 12/2007 | Liu | | |

(Continued)

FOREIGN PATENT DOCUMENTS

| | | | |
|---|---|---|---|
| EP | 0469543 | A2 | 2/1992 |
| JP | 1214939 | A2 | 8/1989 |
| JP | 2009163658 | | 7/2009 |
| JP | 2009288978 | | 12/2009 |

OTHER PUBLICATIONS

Myodrag Potkonjak et al, Cost Optimization in Asic Implementation of Periodic Hard-real Time Systems Using Behvioral Synthesis Techniques (Research Paper), C&C Research Laboratories, NEC USA, Princeton, NJ 08540, 6 Pages.

(Continued)

*Primary Examiner* — Thomas J Cleary

(57) ABSTRACT

A hardware interrupt processing circuit converts selected hardware interrupts to an interrupt vector having bits corresponding to the selected hardware interrupts. The hardware interrupt processing circuit includes circuit assemblies that correspond to the selected hardware interrupts. Each circuit assembly includes a detector circuit and a persistent capture circuit. The detector circuit is to output a pulse responsive to the corresponding selected hardware interrupt being asserted. The persistent capture circuit is triggered by the persistent capture circuit to output a corresponding bit of the interrupt vector until a ready signal has been asserted.

15 Claims, 4 Drawing Sheets

(56) References Cited

U.S. PATENT DOCUMENTS

| | | | |
|---|---|---|---|
| 2008/0091867 A1* | 4/2008 | Plondke et al. | 710/261 |
| 2009/0037926 A1 | 2/2009 | Dinda et al. | |
| 2009/0049443 A1 | 2/2009 | Powers et al. | |
| 2009/0210660 A1 | 8/2009 | Webber | |
| 2009/0248935 A1* | 10/2009 | Ehrlich et al. | 710/264 |
| 2011/0041127 A1 | 2/2011 | Kohlenz et al. | |
| 2012/0226893 A1* | 9/2012 | Prenn et al. | 712/220 |
| 2012/0227052 A1* | 9/2012 | Larson et al. | 718/104 |

OTHER PUBLICATIONS

Esam El-Araby et al, Space and Time Sharing of Reconfigurable Hardware for Accelerated Parallel Processing, NSF Center for High-Performance Reconfigurable Computing, The George Washington University, Washington, DC 20052, 12 Pages.

\* cited by examiner

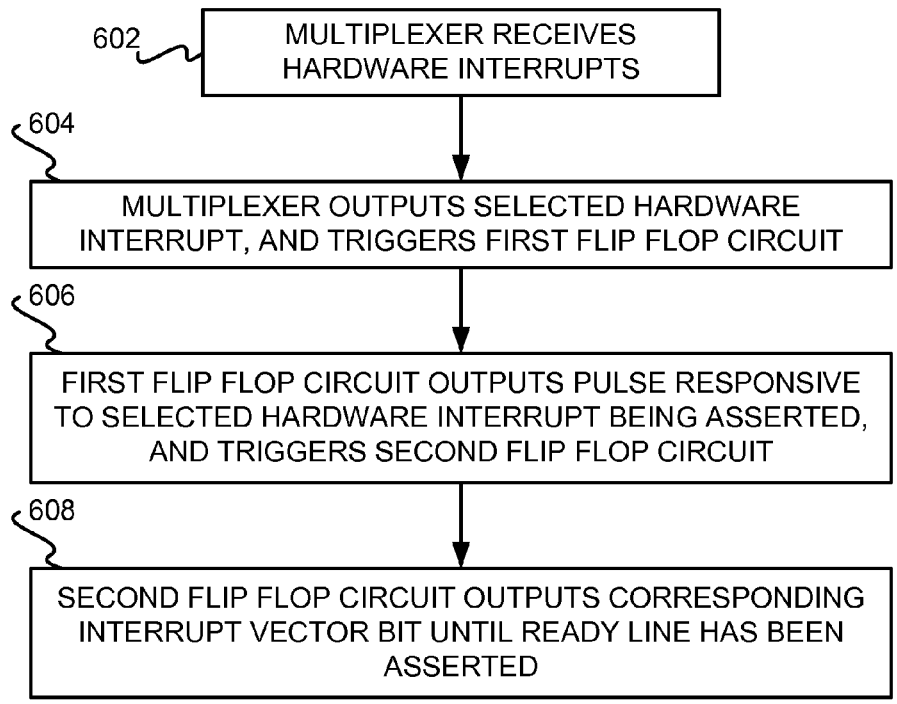
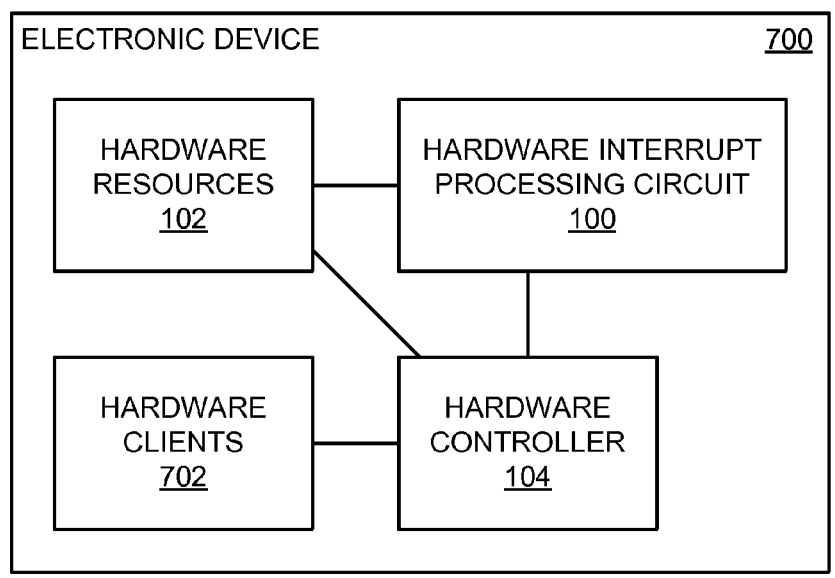

US 8,738,830 B2

HARDWARE INTERRUPT PROCESSING CIRCUIT

BACKGROUND

Hardware resources of electronic devices commonly assert interrupts to signal that events have occurred. These interrupts are referred to as hardware interrupts. More specifically, a hardware interrupt is an asynchronous signal indicating that an event has occurred in relation to a hardware resource and to which attention should be given. Hardware interrupts are a way to avoid wasting a processor or other hardware component's valuable time in polling loops waiting for the events to occur.

BRIEF DESCRIPTION OF THE DRAWINGS

FIG. 6 is a flowchart of an example method of use of a hardware interrupt processing circuit in relation to a circuit assembly thereof.

FIG. 7 is a block diagram of an example representative electronic device including a hardware interrupt processing circuit.

DETAILED DESCRIPTION

Figure 1:
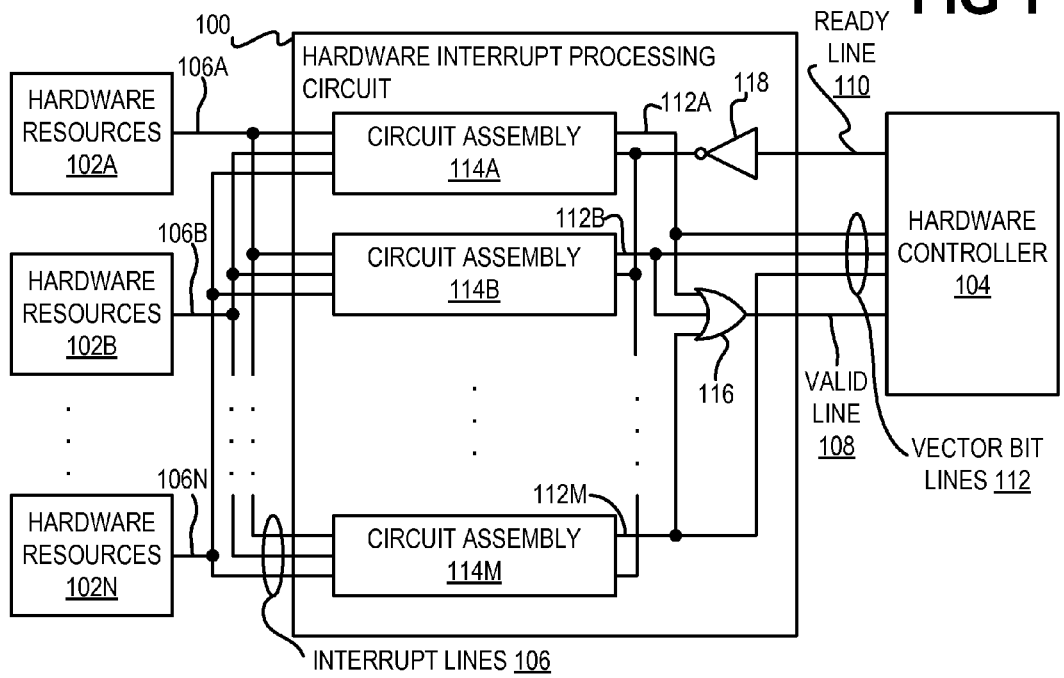
FIG. 1 is a block diagram of an example hardware interrupt processing circuit having a number of circuit assemblies.

As noted in the background section, a hardware interrupt is commonly asserted by a hardware resource of an electronic device to asynchronously signal that an event has occurred in relation to the hardware resource and to which attention should be given. Traditionally, hardware interrupts have been routed to a processor, such as a central processing unit (CPU) or a service processor. Assertion of a hardware interrupt causes the processor to immediately save its current executing state and to instead begin performing an interrupt handler to process the interrupt. The processor knows or can determine the identity of the hardware resource that asserted the hardware interrupt.

This type of interrupt processing works well where a given hardware resource is exclusively used by a particular software process. The processor knows that hardware interrupts asserted by the hardware resource pertain to the software process, because no other process is using the hardware resource. However, in scenarios where a given hardware resource is shared over time by a number of software processes, this type of interrupt processing breaks down. In particular, the processor may not be able to determine with ease, if at all, to which software process a particular hardware interrupt relates.

Disclosed herein are techniques to overcome this problem. Examples of an interrupt processing circuit are disclosed that can interface with a hardware controller that is responsible for sharing hardware resources among a number of clients executing software processes. An example of such a hardware controller is described in the related patent application entitled "hardware controller to choose selected hardware entity and to execute instructions in relation to selected hardware entity," filed on Mar. 3, 2011, and assigned patent application Ser. No. 13/040,000.

The interrupt processing circuit converts selected hardware interrupts to an interrupt vector that has a number of bits corresponding to the selected interrupts. The hardware controller in turn may then use the interrupt vector to determine which hardware resource generated a particular hardware interrupt. The hardware controller already knows which client is currently using the hardware resource, because the controller is responsible for sharing the hardware resources among the clients. As such, the hardware controller can indicate to the client that the hardware interrupt has been asserted, such that the software process executing on the client is able to handle the interrupt appropriately.

The interrupt processing circuit includes a number of circuit assemblies corresponding to the selected hardware interrupts. Each circuit assembly can include a multiplexer, a first flip flop circuit, and a second flip flop circuit. The multiplexer receives as input a number of hardware interrupts encompassing the selected hardware interrupts, and outputs a corresponding selected hardware interrupt. The first flip flop circuit is triggered by the multiplexer to output a pulse responsive to the corresponding selected hardware interrupt being asserted. The second flip flop circuit is triggered by the first flip circuit to output a corresponding bit of the interrupt vector even after the corresponding selected hardware interrupt is subsequently cleared, until a ready signal has been asserted.

The interrupt processing circuit can thus present to the hardware controller an interrupt vector that corresponds to the selected hardware interrupts of interest to the hardware controller. The interrupt processing circuit permits the hardware controller to not have to immediately save its current executing state and instead perform an interrupt handler to process an asserted hardware interrupt. This is because the interrupt processing circuit can output the bits of the interrupt vector corresponding to selected hardware interrupts being asserted until the hardware controller is ready to receive them.

FIG. 1 shows an example hardware interrupt processing circuit 100. The hardware interrupt processing circuit 100 is connected to a number of hardware resources 102A, 102B, ..., 102N, which are collectively referred to as the hardware resources 102, via a number of corresponding interrupt lines 106A, 106B, ..., 106N, which are collectively referred to as the interrupt lines 106. The interrupt processing circuit 100 is also connected to a hardware controller 104, via a valid line 108, a ready line 110, and a number of vector bit lines 112A, 112B, ..., 112M, which are collectively referred to as the vector bit lines 112.

The hardware interrupt processing circuit 100 includes a number of circuit assemblies 114A, 114B, ..., 114M, which are collectively referred to as the circuit assemblies 114. The number of circuit assemblies 114 is equal to the number of vector bit lines 112. The interrupt processing circuit 100 also can include an inverter 118 having an input connected to the ready line 110 and an output connected to each circuit assembly 114, as well as an or gate having inputs connected to the circuit assemblies 114 and an output providing the valid line 108.

The hardware resources 102 assert interrupts on their corresponding hardware interrupt lines 106. Each circuit assembly 114 can be connected to all the interrupt lines 106. The number of circuit assemblies 114 is equal to the maximum number of interrupt lines 106 that the hardware interrupt processing circuit 100 can monitor at any one time. These hardware interrupt lines 106 are referred to as the selected hardware interrupt lines 106, and the hardware interrupts asserted on the selected interrupt lines 106 are referred to as the selected hardware interrupts. Each circuit assembly 114 thus corresponds to a different selected interrupt. The number of interrupt lines 106, and thus the number of hardware resources 102, is typically greater than the number of circuit assemblies 114, although it can be less than or equal to the number of circuit assemblies 114 as well.

The hardware interrupt processing circuit 100 converts the selected hardware interrupts to an interrupt vector having a number of bits corresponding to the selected interrupts. Each circuit assembly 114 is responsible for a different bit of the interrupt vector. As such, the circuit assemblies 114 correspond to the vector bit lines 112, and output the bits of the interrupt vector onto the bit lines 112. In general, when a selected interrupt to which a circuit assembly 114 corresponds has been asserted, the circuit assembly 114 asserts its corresponding vector bit line 112 to signal a logic one, whereas when the selected interrupt has not been asserted, the circuit assembly 114 does not asserts it corresponding vector bit line 112 to signal a logic zero.

The valid line 108 is asserted when one or more selected interrupts have been generated, such that one of one or more vector bit lines 112 have been asserted, to signal to the hardware controller 104 to examine the bit lines 112. The valid line 108 is provided by the or gate 116 performing a logical or operation on the vector bit lines 112, which are the outputs of the circuit assemblies 114. As such, when any of the vector bit lines 112 has been asserted, a valid signal on the valid line 108 is also asserted, in accordance with a logical or operation.

The hardware controller 104 generally signals that it is ready to receive signaling on the vector bit lines 112 by asserting a ready signal on the ready line 110. More specifically, the ready line 110 is asserted high by the hardware controller 104 to inform the hardware interrupt processing circuit 100 that assertions of the vector bit lines 112 are being detected and read by the controller 104. As such, the hardware controller 104 can clear any corresponding hardware interrupt line 106 so that a hardware interrupt is no longer asserted on this interrupt line 106.

By comparison, if the ready line 110 is not asserted high, then the circuit assemblies 114 will continue to assert the vector bit lines 112 upon assertion of the selected hardware interrupts until the ready line 110 is asserted. That is, the hardware interrupt processing circuit 100 is not permitted to remove or change a logic one value on any vector bit line 112 until the ready line 110 has been asserted. The inverter 118 is used to invert the ready signal, so that when the ready line 110 is asserted high, the inverter 118 outputs low, and vice-versa.

In FIG. 1, the hardware controller 104 is depicted as being directly connected to the hardware interrupt processing circuit 100, via the ready line 110, the vector bit lines 112, and the valid line 108. However, the hardware controller 104 may instead be indirectly connected to the hardware interrupt processing circuit 100. For instance, the hardware interrupt processing circuit 100 and the hardware controller 104 may each have a hardware bus interface that is connected to a data bus. As such, at least the vector bit lines 112 are replaced by the bus; the ready line 110 and the valid line 108 may also be replaced by the bus. In this example, the vector bits, and potentially the ready signal and the valid signal, are sent through the bus. By using a bus, the interrupt processing circuit 100 can be located in a separate hardware location that can be accessed by one or more controllers, such as the hardware controller 104, in one or more ASICs or FPGAs, for instance.

Figure 2:
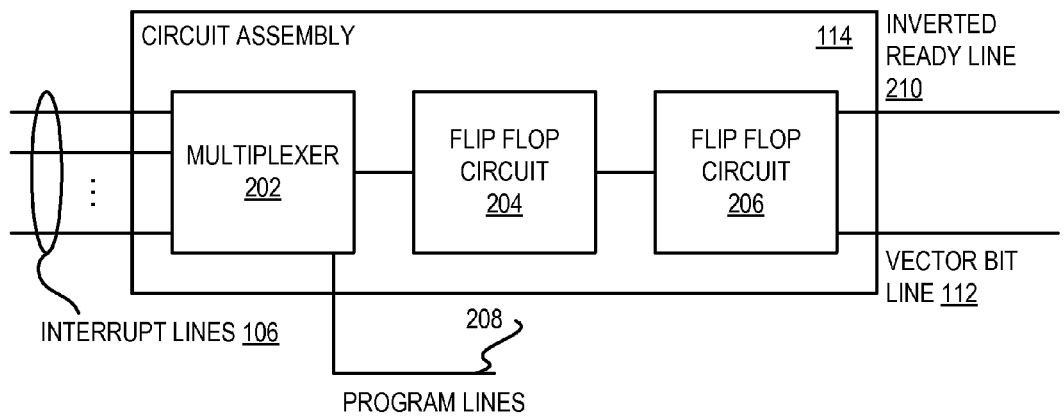
FIG. 2 is a diagram of an example circuit assembly of a hardware interrupt processing circuit.

FIG. 2 shows an example of a representative circuit assembly 114, which can be used to implement each such circuit assembly 114 in FIG. 1. The circuit assembly 114 includes a multiplexer 202, a flip flop circuit 204, and another flip flop circuit 206. The multiplexer 202 receives as input the interrupt lines 106. The multiplexer 202 is programmable via program lines 208 to select one of the interrupt lines 106, which is the selected interrupt line 106 to which the circuit assembly 114 corresponds.

The flip flop circuit 204 is triggered by the multiplexer 202 to output a pulse responsive to the corresponding selected hardware interrupt being asserted, which is the hardware interrupt that is asserted on the selected interrupt line 106 to which the circuit assembly 114 corresponds. The flip flop circuit 204 is more generally referred to as a detector circuit, insofar as the circuit 204 detects the corresponding selected hardware interrupt being asserted. The flip flop circuit 206 is triggered by the flip flop circuit 204 to output a corresponding bit of the interrupt vector on its vector bit line 112 until the ready line 110 of FIG. 1 has been asserted. The flip flop circuit 206 can thus receive as input an inversion of the ready line 110, which is indicated in FIG. 2 as the inverted ready line 210. The flip flop circuit 206 is more generally referred to as a persistent capture circuit, insofar as the circuit 206 captures the pulse output by the flip flop circuit 204 and persistently outputs a corresponding bit of the interrupt vector until the ready line 110 has been asserted.

The circuit assembly 114 of FIG. 2 can be a synchronous circuit that operates in conjunction with a clock that is not depicted in FIG. 2. As such, the two flip flop circuits 204 and 206 can be synchronous flip flop circuits, as opposed to asynchronous latch circuits. For example, the flip flop circuits 204 and 206 may change their states (from logic zero to logic one and vice-versa) just at leading edges of the clock signal.

In FIG. 2, the multiplexer 202 receives as input the interrupt lines 106 to select the selected interrupt line 106 to which the circuit assembly 114 corresponds. Including the multiplexer 202 is beneficial, because it permits the circuit assembly 114 to be programmed to selected a different selected interrupt line 106 as desired, by correspondingly programming the multiplexer 202. However, the multiplexer 202 may be omitted, such that the circuit assembly 114 is hardwired to a selected interrupt line 106. Omitting the multiplexer 202 simplifies the circuit assembly 114, but as a result the circuit assembly 114 may not be able to be programmed to correspond to a different interrupt line 106.

Figure 3:
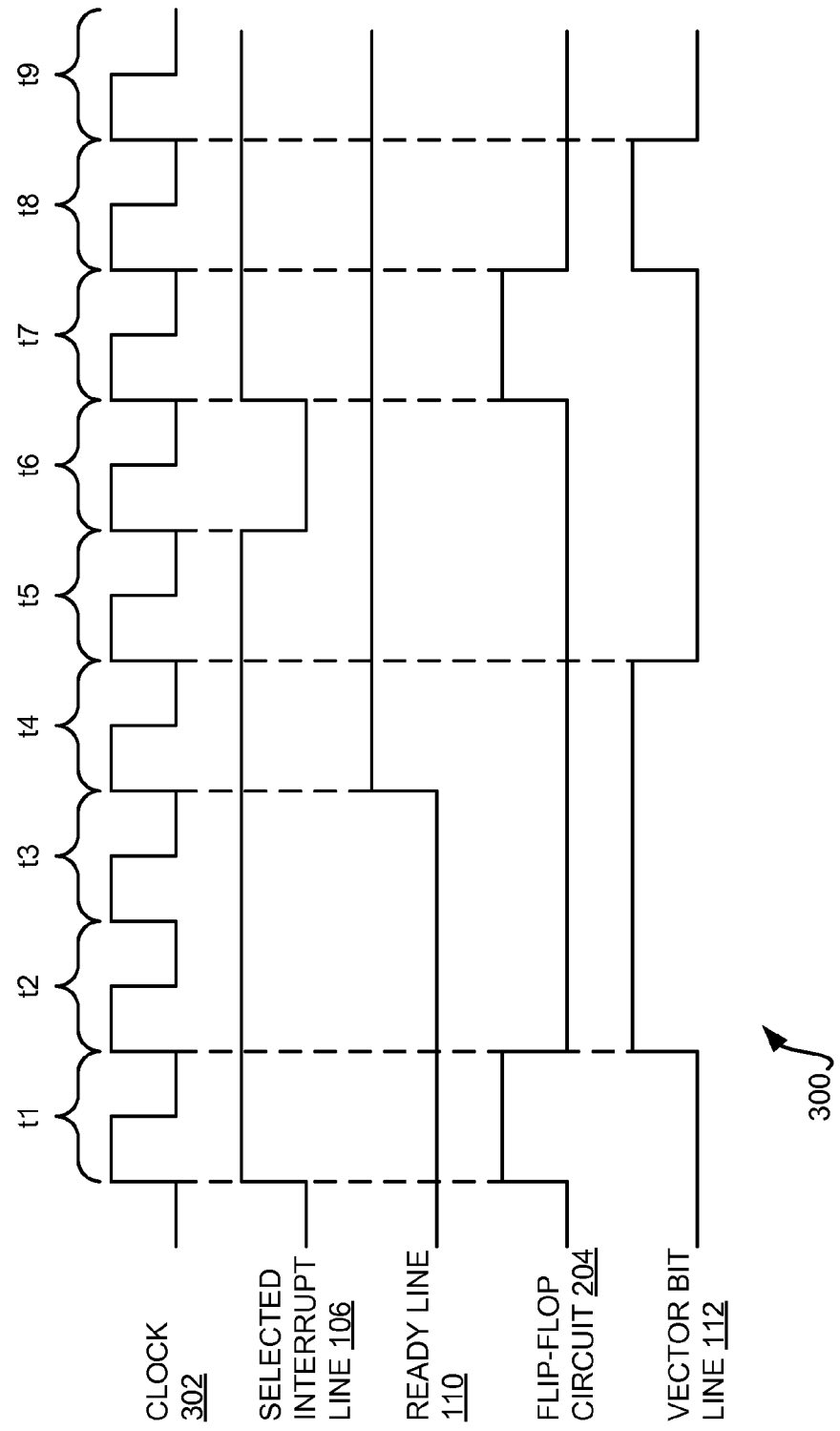
FIG. 3 is an example timing diagram of a hardware interrupt processing circuit.

FIG. 3 shows an example timing diagram 300 of the hardware interrupt processing circuit 100 in relation to the representative circuit assembly 114 of FIG. 2. The timing diagram 300 includes a clock 302, the selected hardware interrupt line 106 to which the circuit assembly 114 corresponds, and the ready line 110. The timing diagram 300 also includes the output of the flip flop circuit 204, and the vector bit line 112, which corresponds to the output of the flip flop circuit 206. It is noted that if no other selected hardware interrupt line 106 has a hardware interrupt asserted thereon within the duration of the timing diagram 300, the vector bit line 112 also corresponds to the valid line 108, since the valid line 108 is generated by performing a logical or operation on the vector bit lines 112.

The clock 302 has a signal divided over ten clock cycles denoted as times t1, t2, t3, t4, t5, t6, t7, t8, t9, and t10. It is assumed in FIG. 3 that the ready line 110 has not been asserted yet, and that the selected interrupt line 106 has not yet had a hardware interrupt asserted thereon. At time t1, a hardware interrupt is assumed to be asserted on the selected interrupt line 106. The flip flop circuit 204 correspondingly outputs a pulse that is one clock cycle in length, ending at time t2. The vector bit line 112 itself is asserted high at time t2.

The vector bit line 112 remains high until the ready line 110 is asserted. Thus, because the ready line 110 is not asserted until time t4, the vector bit line 112 stays asserted until time t5, one clock cycle after the ready line 110 has been asserted. It is assumed that at time t6 the hardware interrupt asserted on the selected hardware interrupt line 106 has been cleared, and that at time t7 the selected interrupt line 106 again has a hardware interrupt asserted thereon. Therefore, the flip flop circuit 204 again correspondingly outputs a pulse that is one clock cycle in length, ending at time t8. The vector bit line 112 itself is also asserted high at time t8.

However, when the vector bit line 112 is asserted high at time t8, the ready line 110 has already been asserted. Therefore, the vector bit line 112 is no longer asserted at time t9. FIG. 3 thus illustrates that the vector bit line 112 remains high responsive to the selected hardware interrupt being asserted until the ready line 110 has been asserted. If the ready line 110 is not asserted until after the vector bit line 112 is asserted, then the vector bit line 112 does not transition from high to low until one clock cycle after the ready line 110 is asserted. If the ready line 110 is already asserted when the vector bit line 112 is asserted, then the vector bit line 112 remains asserted for just one clock cycle.

Figure 4:
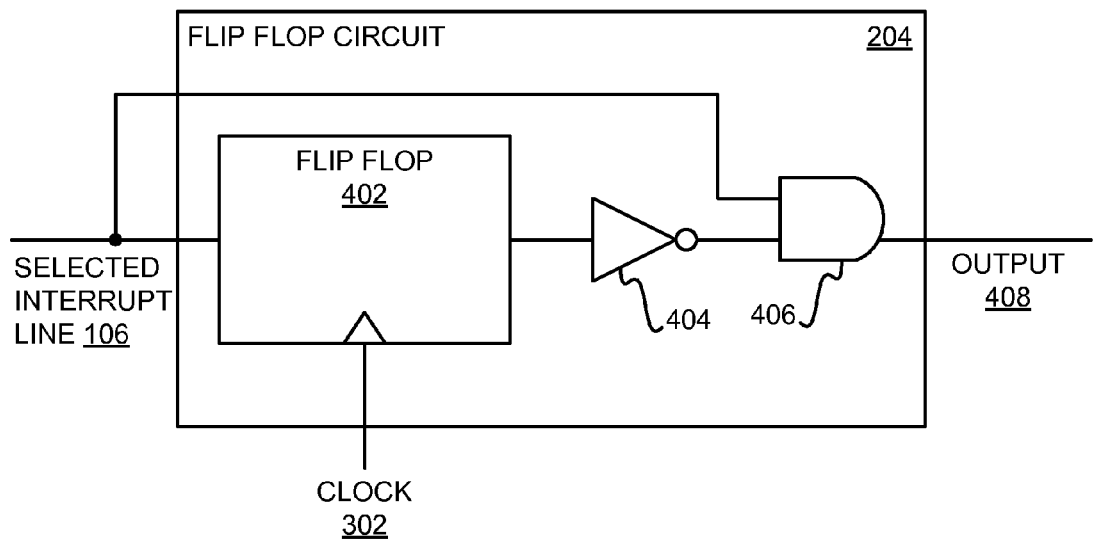
FIG. 4 is a diagram of an example first flip flop circuit of a circuit assembly of a hardware interrupt processing circuit.

FIG. 4 shows an example of the flip flop circuit 204 of FIG. 2, consistent with the timing diagram 300 of FIG. 3. However, the flip flop circuit 204 may be implemented in a manner other than as depicted in FIG. 4. The flip flop circuit 204 in FIG. 4 includes a flip flop 402, an inverter 404, and an and gate 406. The flip flop 402 is a synchronous delay-type flip flop in the example of FIG. 4, which can change state at the leading edge of the clock signal provided by the clock 302. The output of the flip flop 402 is thus a delayed version of the input of the flip flop 402, and the input of the flip flop 402 is the selected hardware interrupt line 106 provided by the multiplexer 202.

The input of the inverter 404 is connected to the output of the flip flop 402, and the output of the inverter 404 is connected to one of the two inputs of the and gate 406. The other input of the and gate 406 is connected to the hardware selected interrupt line 106 (i.e., the input of the flip flop 402). The output of the and gate 406 is the output 408 of the flip flop circuit 204, as depicted in the timing diagram 300 of FIG. 3.

In operation, assume that the flip flop 402 is low (i.e., storing a logic zero), and that a hardware interrupt has not been on the selected hardware interrupt line 106. The output of the inverter 404 is thus high, and the output of the and gate 406 is low, because the selected hardware interrupt line 106 is low. When a hardware interrupt is asserted on the selected hardware interrupt line 106, the output 408 transitions to high. This is because during this clock cycle the flip flop 402 has not yet transitioned from low to high, which means that the output of the inverter 404 remains high, and both the inputs of the and gate 406 are high.

However, at the clock cycle after this clock cycle, the flip flop 402 will transition from low to high. Therefore, the output of the inverter 404 is low, and regardless of whether the selected hardware interrupt line 106 remains asserted with the selected hardware interrupt, the output of the and gate 406 is low. In this way, the flip flop circuit 204 outputs a pulse responsive to the selected hardware interrupt line 106 being asserted with the selected hardware interrupt (i.e., responsive to triggering by the multiplexer 202). It is said that the flip flop 402, the inverter 404, and the and gate interact with one another to output a pulse responsive to the corresponding selected hardware interrupt being asserted.

Figure 5:
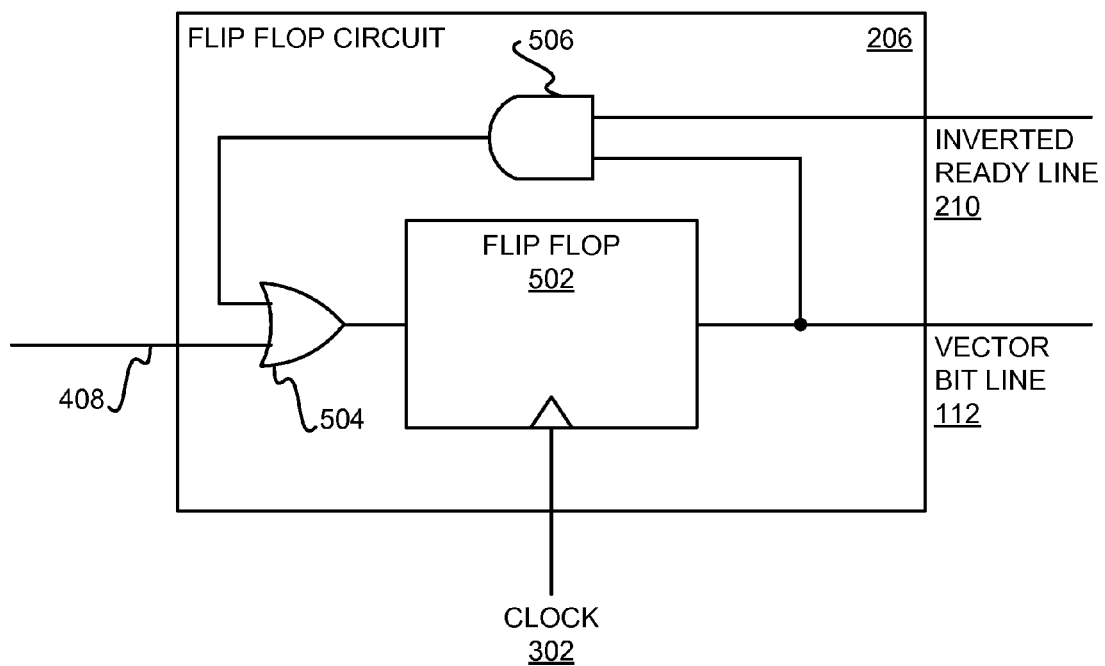
FIG. 5 is a diagram of an example second flip flop circuit of a circuit assembly of a hardware interrupt processing circuit.

FIG. 5 shows an example of the other flip flop circuit 206 of FIG. 2, consistent with the timing diagram 300 of FIG. 3. However, the flip flop circuit 206 may be implemented in a manner other than as is depicted in FIG. 5. The flip flop circuit 206 in FIG. 5 includes a flip flop 502, an or gate 504, and an and gate 506. The flip flop 502 is a synchronous delay-type flip flop in the example of FIG. 5, which changes state at the leading edge of the click signal provided by the clock 302. The output of the flip flop 502 is thus a delayed version of the input of the flip flop 502, and is or provides the vector bit line 112 of the circuit assembly 114 of which the flip flop circuit 206 is a part.

The input of the flip flop 502 is connected to the output of the or gate 504. One input of the or gate 504 is connected to the output 408 of the flip flop circuit 204 of FIG. 4. The other input of the or gate is connected to the output of the and gate 506. One input of the and gate 506 is connected to the inverted ready line 210, and the other input of the and gate 506 is connected to the output of the flip flop 502. The output of the and gate 506 (i.e., the vector bit line 112) is consistent with the timing diagram 300 of FIG. 3.

In operation, assume that the flip flop 502 is low (i.e., storing a logic zero), and that the output 408 of the flip flop circuit 204 of FIG. 4 is also low. Also assume that the inverted ready line 210 is high, corresponding to the hardware controller 104 of FIG. 1 not having asserted the ready line 110 of FIG. 1. Therefore, the vector bit line 112 is also low, since the bit line 112 is the output of the flip flop 502. The flip flop 502 does not transition from low to high, because the output of the and gate 506 remains low, and both inputs of the or gate 504 are also low.

When a hardware interrupt is asserted on the selected hardware interrupt line 106 corresponding to the circuit assembly 114 of which the flip flop circuit 206 is a part, the output 408 of the flip flop circuit 204 of FIG. 4 transitions from low to high. As such, the output of the or gate 504 becomes high, and at the next clock cycle, the flip flop 502 transitions from low to high, such that the vector bit line 112 is at logic one. Because the inverted ready line 210 is also high, this means that the output of the and gate 506 becomes high, such that the output of the or gate 504 remains high even after the output 408 of the flip flop circuit 204 transitions back to low.

Once the ready line 110 of FIG. 1 has been asserted by the hardware controller 104 of FIG. 1, the inverted ready line 210 transitions to low. Therefore, at the next clock cycle the output of the flip flop 502 transitions to low, assuming that the output 408 of the flip flop circuit 204 remains low so that the output of the or gate 504 is low. As such, one clock cycle after the ready line 110 has been asserted, the vector bit line 112 of the flip flop circuit 206 transitions to low.

Assume next that the output 408 of the flip flop circuit 204 of FIG. 4 again transitions from low to high, while the inverted ready line 210 remains low (i.e., corresponding to the hardware controller 104 of FIG. 1 still asserting the ready line 110 of FIG. 1). The output of the or gate 504 will transition to high, meaning that one clock cycle later, the output of the flip flop 502, and thus the vector bit line 112, will transition to high. However, the output of the flip flop 502 will remain high for just one clock cycle. This is because both inputs of the or gate 504 will have transitioned back to low.

Specifically, the output 408 of the flip flop circuit 204 will have transitioned back to low, since the flip flop circuit 204 provides just a pulse, and the output of the and gate 506 will remain low, because the inverted ready line 210 is low. As such, when the inverted ready line 210 is kept low, the vector bit line 112 stays high for just one clock cycle. It is thus said that the flip flop 502, the or gate 504, and the and gate 506 interact with one another to output the corresponding bit of the interrupt vector, on the vector bit line 112, until the ready line 110 of FIG. 1 has been asserted.

FIG. 6 shows an example method of use 600 of the hardware interrupt processing circuit 100. The method 600 is performed by each circuit assembly 114 of the interrupt processing circuit 100. The multiplexer 202 receives the hardware interrupts asserted on the hardware interrupt lines 106 (602). The multiplexer outputs a selected hardware interrupt to which the circuit assembly 114 in question corresponds, and triggers the flip flop circuit 204 (604).

The flip flop circuit 204 outputs a pulse responsive to the selected hardware interrupt being asserted, and triggers the flip flop circuit 206 (606). The flip flop circuit 206 in turn outputs a corresponding interrupt vector bit (i.e., logic one) on the vector bit line 112 in question until the ready line 110 has been asserted (608). As described above, if the ready line 110 is not asserted at the time the flip flop circuit 206 is asserted, then the vector bit line 112 remains high for one clock cycle after the ready line 110 is asserted. By comparison, if the ready line 110 is being asserted at the time the flip flop circuit 206 is asserted, then the vector bit line 112 remains high for one clock cycle.

In conclusion, FIG. 7 shows an example and rudimentary electronic device 700. The electronic device 700 includes the hardware interrupt processing circuit 100, the hardware resources 102, the hardware controller 104, as well as hardware clients 702. The electronic device 700 may be an image-forming device, such as a printing device, or another type of device, such as a computing device like a general-purpose computer, among other types of electronic devices.

The hardware controller 104 permits the hardware clients 702 to share the hardware resources 102. For instance, such sharing can be accomplished as described in the related patent application referenced earlier. When the hardware resources 102 assert hardware interrupts, the hardware interrupt processing circuit 100 converts the hardware interrupts to an interrupt vector having a number of bits, which is read by the hardware controller 104. The hardware controller 104 in turn can signal the appropriate hardware client 702, which can then act on the hardware interrupt.

For example, the electronic device 700 may be a color printing device that forms images on media like paper in full color. The printing device may have a number of different colorants, such as cyan, magenta, yellow, and black. Color processing is performed to convert full color image data to each such color, and the colorant of each color is output onto the media separately by one or more print engines. For a given portion of the image data, such as a given line thereof, the different colorants may be output onto the media at different times.

As a part of the color printing process, relatively large amounts of data have to be copied. To facilitate this process, there are hardware resources dedicated to performing copying. Such hardware resources may be referred to as copy blocks. There may be many copy operations that have to be performed, where the copy operations can be represented as the hardware clients 702. However, there may be an unequal amount of data that has to be copied in one copy operation as compared to another copy operation. As such, one copy block may be working for an excessively long time, whereas the other copy blocks may not be working at all.

The techniques disclosed herein therefore permit the four copy blocks—or other number of copy blocks—to be shared among the hardware clients 702. These copy blocks correspond to the hardware resources 102. When a copy block is finished, it can signal this information to the hardware controller 104 by asserting its interrupt line 106. As such, the hardware controller 104 may be able to provide the copy block with additional processing to be performed, for the same or different hardware client 702. Therefore, the direct connection between the hardware clients 702 and the hardware resources 102 (i.e., the copy blocks) can be removed by the techniques disclosed herein.

We claim:

1. A hardware interrupt processing circuit to convert a plurality of selected hardware interrupts to an interrupt vector having a plurality of bits corresponding to the plurality of selected hardware interrupts, comprising:
   a plurality of circuit assemblies corresponding to the plurality of selected hardware interrupts, each circuit assembly comprising:
      a detector circuit to output a pulse responsive to a corresponding selected hardware interrupt of the plurality of selected hardware interrupts being asserted; and,
      a persistent capture circuit triggered by the detector circuit to output a corresponding bit of the plurality of bits of the interrupt vector until a ready signal has been asserted.

2. The hardware interrupt processing circuit of claim 1, wherein each circuit assembly further comprises a multiplexer to receive as input a plurality of hardware interrupt encompassing the plurality of selected hardware interrupts and to output the corresponding selected hardware interrupt,
   and wherein the plurality of hardware interrupts received by the multiplexer of each circuit assembly is identical.

3. The hardware interrupt processing circuit of claim 1, wherein each circuit assembly further comprises a multiplexer to receive as input a plurality of hardware interrupt encompassing the plurality of selected hardware interrupts and to output the corresponding selected hardware interrupt,
   and wherein the multiplexer of each circuit assembly is programmable to select the corresponding selected hardware interrupt from the plurality of hardware interrupts input to the multiplexer.

4. The hardware interrupt processing circuit of claim 3, wherein the detector circuit of each circuit assembly comprises a flip flop having an input connected to an output of the multiplexer.

5. The hardware interrupt processing circuit of claim 4, wherein the detector circuit of each circuit assembly further comprises:
   an inverter connected to an output of the flip flop; and,
   an and gate having a first input connected to an output of the inverter, a second input connected to the output of the multiplexer, and an output to provide an output of the detector circuit,
   such that the flip flop, the inverter, and the and gate interact to output the pulse responsive to the corresponding selected hardware interrupt being asserted.

6. The hardware interrupt processing circuit of claim 1, wherein the persistent capture circuit of each circuit assembly comprises a flip flop having an output to provide the corresponding bit.

7. The hardware interrupt processing circuit of claim 6, wherein the persistent capture circuit of each circuit assembly further comprises:
   an and gate having a first input connected to an inversion of a ready line on which the ready signal is asserted and a second input connected to the output of the flip flop; and,
   an or gate having a first input connected to an output of the and gate, a second input connected to an output of the detector circuit, and an output connected to an input of the flip flop, such that the flip flop, the and gate, and the or gate interact to output the corresponding bit until the ready line has been asserted.

8. The hardware interrupt processing circuit of claim 7, further comprising an inverter connected to the ready line to provide the inversion of the ready line.

9. The hardware interrupt processing circuit of claim 1, wherein a valid line is to indicate that one or more of the selected hardware interrupts have been asserted.

10. The hardware interrupt processing circuit of claim 9, further comprising an or gate having a plurality of inputs and an output, each input connected to the persistent capture circuit of a different one of the circuit assemblies, the output to provide the valid line.

11. An electronic device comprising:
   a plurality of hardware resources to output a plurality of hardware interrupts;
   a hardware controller to receive an interrupt vector having a plurality of bits corresponding to a plurality of selected hardware interrupts encompassed by the plurality of hardware interrupts; and,
   a hardware interrupt processing circuit to convert the plurality of selected hardware interrupts to the interrupt vector, the hardware interrupt processing circuit comprising a plurality of circuit assemblies corresponding to the plurality of selected hardware interrupts, each circuit assembly comprising:
      a multiplexer to receive as input the plurality of hardware interrupts and to output a corresponding selected hardware interrupt of the plurality of selected hardware interrupts;
      a detector circuit triggered by the multiplexer to output a pulse responsive to the corresponding selected hardware interrupt being asserted; and,
      a persistent capture circuit triggered by the first flip circuit to output a corresponding bit of the plurality of bits of the interrupt vector until a ready signal has been asserted.

12. The electronic device of claim 11, wherein the detector circuit of each circuit assembly comprises:
   a flip flop having an input connected to an output of the multiplexer;
   an inverter connected to an output of the flip flop; and,
   an and gate having a first input connected to an output of the inverter, a second input connected to the output of the multiplexer, and an output to provide an output of the detector circuit, such that the flip flop, the inverter, and the and gate interact to output the pulse responsive to the corresponding selected hardware interrupt being asserted.

13. The electronic device of claim 11, wherein the persistent capture circuit of each circuit assembly comprises:
   a flip flop having an output to provide the corresponding bit;
   an and gate having a first input connected to an inversion of a ready line on which the ready signal is asserted and a second input connected to the output of the flip flop; and,
   an or gate having a first input connected to an output of the and gate, a second input connected to an output of the detector circuit, and an output connected to an input of the flip flop,
   such that the flip flop, the and gate, and the or gate interact to output the corresponding bit until the ready line has been asserted.

14. The electronic device of claim 11, wherein the hardware interrupt processing circuit further comprises an or gate having a plurality of inputs and an output, each input connected to the persistent capture circuit of a different one of the circuit assemblies, the output to provide a valid line to indicate that one or more of the selected hardware interrupts have been asserted.

15. A method for converting a plurality of selected inputs to an interrupt vector having a plurality of bits corresponding to the plurality of selected hardware interrupts, comprising:
   by each circuit assembly of a plurality of circuit assemblies of a hardware interrupt processing circuit, the plurality of circuit assemblies corresponding to the plurality of selected hardware interrupts,
      receiving by a multiplexer of the circuit assembly a plurality of hardware interrupts encompassing the plurality of selected interrupts;
      outputting by the multiplexer a corresponding selected hardware interrupt of the plurality of selected hardware interrupts;
      outputting by a detector circuit of the circuit assembly a pulse responsive to the corresponding selected hardware interrupt being asserted, the detector circuit triggered by the multiplexer; and,
      outputting by a persistent capture circuit of the circuit assembly a corresponding bit of the plurality of bits of the interrupt vector until a ready signal has been asserted, the persistent capture circuit triggered by the detector circuit.

\* \* \* \* \*